(12) United States Patent
Capone et al.

(10) Patent No.: US 6,393,281 B1
(45) Date of Patent: *May 21, 2002

(54) SEAMLESS HAND-OFF FOR AIR-TO-GROUND SYSTEMS

(75) Inventors: Gregory J. Capone, Gapland; Richard M. Gardner, Gaithersburg; Matthew Mehdi Mohebbi, N. Potomac; Walter Robert Kepley, III, Gaithersburg; John Dennis Kenyon, Potomac; David Alan Roos, Boyds, all of MD (US)

(73) Assignee: AT&T Wireless Services Inc, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/451,719

(22) Filed: May 26, 1995

Related U.S. Application Data

(63) Continuation of application No. 08/037,600, filed on Mar. 26, 1993, now abandoned.

(51) Int. Cl.$^7$ .............................................. H04B 7/185
(52) U.S. Cl. ........................................ 455/428; 455/431
(58) Field of Search ............................... 455/33.1, 33.2, 455/33.4, 34.1, 34.2, 54.1, 56.1, 62, 52.8, 52.3, 67.1, 67.3, 422, 423, 428, 431, 436, 437, 438, 439, 440, 441, 442, 450, 455

(56) References Cited

U.S. PATENT DOCUMENTS

| 4,419,766 | A | * | 12/1983 | Goeken et al. ............ 455/56.1 |
| 5,029,196 | A | | 7/1991 | Morganstein ................. 379/67 |
| 5,170,485 | A | * | 12/1992 | Levine et al. .............. 455/33.4 |
| 5,212,804 | A | * | 5/1993 | Choate ....................... 455/34.1 |
| 5,249,303 | A | | 9/1993 | Goeken ..................... 455/56.1 |
| 5,267,261 | A | | 11/1993 | Blakeney, II et al. ...... 455/34.1 |
| 5,323,446 | A | * | 6/1994 | Kojima et al. ............. 455/33.2 |
| 5,392,331 | A | * | 2/1995 | Patsiokas et al. .......... 455/33.2 |

* cited by examiner

Primary Examiner—Thanh Cong Le

(57) ABSTRACT

Seamless hand-off of air-to-ground telephony calls is achieved autonomously within an aircraft by using one of at least two radio links to search for additional ground stations. The search for candidate ground stations for hand-off is expedited by eliminating ground stations exhibiting zero or negative Doppler effects. Other values indicating quality of the link corresponding to the channel over which the search is conducted is compared with the quality of the call and an alternate call is established using the call identification code previously established for the call in progress. The hand-off of the call may then be easily conducted by transferring the voice signal to the channel over which the search was conducted. This is preferably done at a time when the transmission quality of the two channels would be approximately the same or the quality improved on the channel to which hand-off is made.

27 Claims, 4 Drawing Sheets

SEAMLESS HAND-OFF FOR AIR-TO-GROUND SYSTEMS

This application is a continuation of U.S. patent application Ser. No. 08/037,600, filed Mar. 26, 1993, abandoned.

BACKGROUND OF THE INVENTION

1. Field of the Invention

The present invention generally relates to mobile telecommunications and, more particularly, to air-to-ground telecommunications through a sequence of ground stations through which maximum quality communications may be maintained during the course of a flight.

2. Description of the Prior Art

Recent progress in high-frequency radio communications has enabled the support of many simultaneous communication links such as are involved in telecommunications. In particular, mobile telephony has effectively replaced citizens band radio as the communication link of choice when one or a plurality of communicating parties are located in vehicles such as automobiles, boats or airplanes. In fact, the limited number of channels available limited the privacy of such communications and use of such communications was therefore inappropriate to many of the types of communication commonly conducted by telephone. More recently, however, so-called cellular telephony systems, characterized by the overlapping reception fields have made the privacy and convenience expected of stationary communications utilities available to the mobile communications market.

In cellular telephony systems, the size of the reception area of a single cell is very large relative to the speed of vehicle travel. That is, due to the overlapping arrangement of the reception fields, a channel will normally be available through at least one cell for a given location of the mobile transmitter. Further, while a call may be extended, it is relatively unlikely that a call will continue while the vehicle moves beyond the range of the cell in which it is begun or even so close to a fringe area of the cell that service will be significantly impaired.

The same is not true of air-to-ground telecommunications due to the increased speed of the aircraft with which the communication may be held. While air-to-ground telecommunications are in many ways similar to cellular telephony systems, the speed of the mobile vehicle and the average duration of the call (since the caller is seldom the operator of the vehicle as is often the case in communications to automobiles) are significant in comparison to the diameter of the zone over which quality communication may be maintained. In addition, atmospheric conditions may be more likely to increase packet error rate and reduce received signal power. Doppler shift effects which may reduce transmission quality may also be significant in air-to-ground telephony but of negligible effect at the normal speeds of ground or water based vehicles.

The concept of altering communication links while a particular call is in process is complex but not unknown in telephony. However, such transfers are often accomplished in telecommunication utilities for the benefit of the utility in accommodating traffic levels at any particular time. Ideally, the quality of service provided by stationary facilities should not change but, in practice, quality may be affected by atmospheric conditions where microwave or satellite links are employed. Even where communication links must be changed during the course of a call, the time delay inherent in each communication link is constant in stationary systems to a relatively high degree of accuracy regardless of atmospheric conditions. Wired links will be largely immune from variation in propagation delays due to variation of atmospheric conditions. Therefore, the transfer of communications links can usually be accomplished fairly simply and largely without the users becoming aware of the transfer, even when complex hand-off procedures are employed. Under normal circumstances in a stationary system, a second communication link is established in a synchronized fashion and time correlated or piggy-backed with the first. Then, at an appropriate time, such as when the packet rate is low, the hand-off is accomplished by substituting the second link for the first. The slight time shift is not noticeable to the users since it will usually be manifested in the slight shortening or lengthening of a period of relative silence, for which the respective users have no reference.

In a cellular system, however, to avoid the loss of a call when a mobile cellular unit travels beyond the range at which a base station can maintain a good quality communication link, a base station controlled "hand-off mechanism has been developed. In this hand-off mechanism, a channel unit of the base station measures the quality of the signal from the mobile unit and notifies the base station controller when quality drops below a predetermined level. The base station controller will contain a list of adjacent base stations and, when the received signal quality becomes low, commands these adjacent base stations to scan for the radio link on which the call is being conducted. It should be noted that cellular systems are synchronously operated with a national clock and the scanning process requires testing received signals for signal from the mobile unit in the same signal transmission frame at a plurality of adjacent stations. When such a signal is found at another base station, the received signal quality is tested and the hand-off is controlled by one of the base stations.

So-called mobile assisted hand-off systems are also known which are similar to the hand-off mechanism for cellular telephony. In mobile assisted hand-off systems, the mobile unit is directed to scan control frequencies of the adjacent base stations and to notify the current base station of the strongest candidates. The base station then directs only those candidate base stations to scan for the signal of the mobile station.

Both of these systems require many complex operations and numerous communications between base stations as well as requiring the ground-based system to be operated in a synchronized manner. However, this complexity is tolerable in view of the low likelihood that a hand-off will be required.

In contrast, with mobile communications involving a high speed aircraft the time during which an aircraft remains within good quality communication range of a base station is very much reduced and the likelihood that a hand-off will be required during a particular call is very much increased. Further, time relationships and propagation delays are constantly changing. Therefore, it is difficult to provide a change of communications links which is "seamless" and not readily detectable by an operator since such a change is often accompanied by momentary high noise levels or the omission or repetition of a portion of the communication or a very audibly noticeable change in the quality of the communication link. The changing time relationships also would complicate the scanning for the call from the mobile unit if a complex, synchronous system such as are used in cellular or mobile assisted hand-off systems were to be employed.

SUMMARY OF THE INVENTION

It is therefore an object of the present invention to provide a technique of alteration of communication links in which the quality of communication links will be closely matched.

It is another object of the present invention to provide a system for substitution of communication links in which the communication will be substantially "seamless" and without noticeable time error.

In order to accomplish these and other objects of the invention, a method is provided for substitution of communication links in a seamless manner including the steps of establishing a first communication channel carrying a call over a first communication link, establishing a second communication channel over a different communication link, establishing a call over the second communication channel corresponding to the call carried by said first communication channel, comparing quality of transmission in said first and second channels, and transferring voice signals of the call from the first communication channel to the second communication channel in response to the comparing step.

In accordance with another aspect of the invention, a method is provided for substitution of communication links between a mobile telephony unit and ones of a plurality of ground stations in a seamless manner including the steps of comparing quality of reception at said mobile unit over at least first and second communication links between the mobile unit and respective first and second ground stations, and transferring call signals between the first and second communication links in response to said comparing step.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
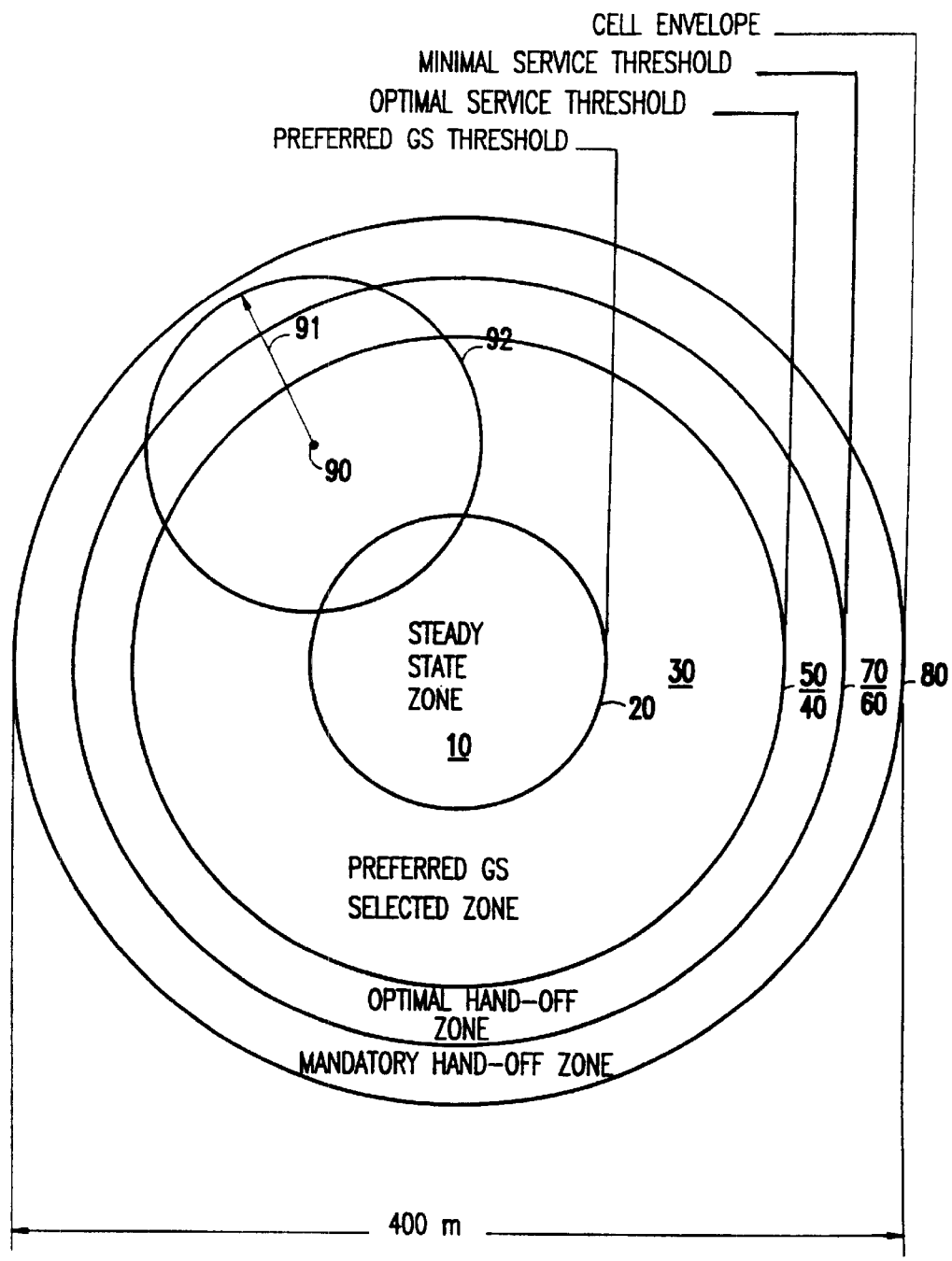
FIG. 1 is a diagram of the operational range of a base station.

Referring now to the drawings, and more particularly to FIG. 1, there is shown a diagram of the transmission/reception typical of a ground or base station for airborne telecommunications. The pattern is generally circular and centered on the transmitter location. However, local geography, meteorological conditions and the like can make the pattern vary, as noted above. However, the general proportionality of the sub-ranges will remain approximately the same. These sub-ranges are somewhat arbitrary since they correspond to differences in reception quality of either the mobile (e.g. airborne) station or the base station or both. However, it is to be understood that this qualitative differentiation is largely based on quantitative measurements of reception parameters such as signal strength, signal to noise ratio and bit error rate.

The diameter of the cell envelope 80 is generally about 400 miles. The radius is divided approximately into thirds and the outer third again divided into halves. Thus, the minimal service threshold 60 is about 33 miles inside the cell envelope 80, the optimal service threshold 40 is about 33 miles inside the minimal service threshold 60, and the preferred ground station threshold 20 is about 66 miles inside the optimal service threshold 40, leaving a steady state zone 10 of about 132 miles in diameter centered on the ground station.

It is important to realize from FIG. 1 that the average operational airspeed of commercial aircraft is about five hundred to five hundred fifty miles per hour. Therefore, a diameter of the entire cell envelope 80 would normally be traversed in somewhat less than forty-eight minutes and the diameter of the steady state zone 10 would be traversed in one-third that time or somewhat less than eighteen minutes. More importantly, perhaps, the width of the optimal hand-off zone 50 could be traversed in a radial direction in about four minutes or less. Considering these transit times relative to a distribution of normal telephone call durations, it can be readily appreciated that a large number of air-to-ground calls beginning at arbitrary times (and, hence, locations) while air aircraft is traversing an arbitrary but generally linear flight path will require hand-off to an adjacent ground station before the minimal service threshold 60 is crossed where the aircraft enters the mandatory hand-off zone 70. For example, a call beginning when an aircraft was at point 90 which lasted for ten minutes while the aircraft traversed a linear flight path such as 91 would terminate when the aircraft was at some point on the locus indicated by circle 92, about one third of which are within the mandatory hand-off zone 70 which is beyond the minimal service threshold 60. (It should be understood that the cell envelope allows a call to continue but at a lower than desired level (e.g. "minimal" of quality.) About one-half of the points on locus 92 are outside the preferred ground station selected zone 30 and, since the duration or the call (e.g. the radius of locus 92) is not known while the call is in progress, hand-off should be attempted in about one-half of all ten-minute calls beginning at point 90 and the hand-off completed in substantially more than one-third in order to maintain communication quality.

Figure 2:
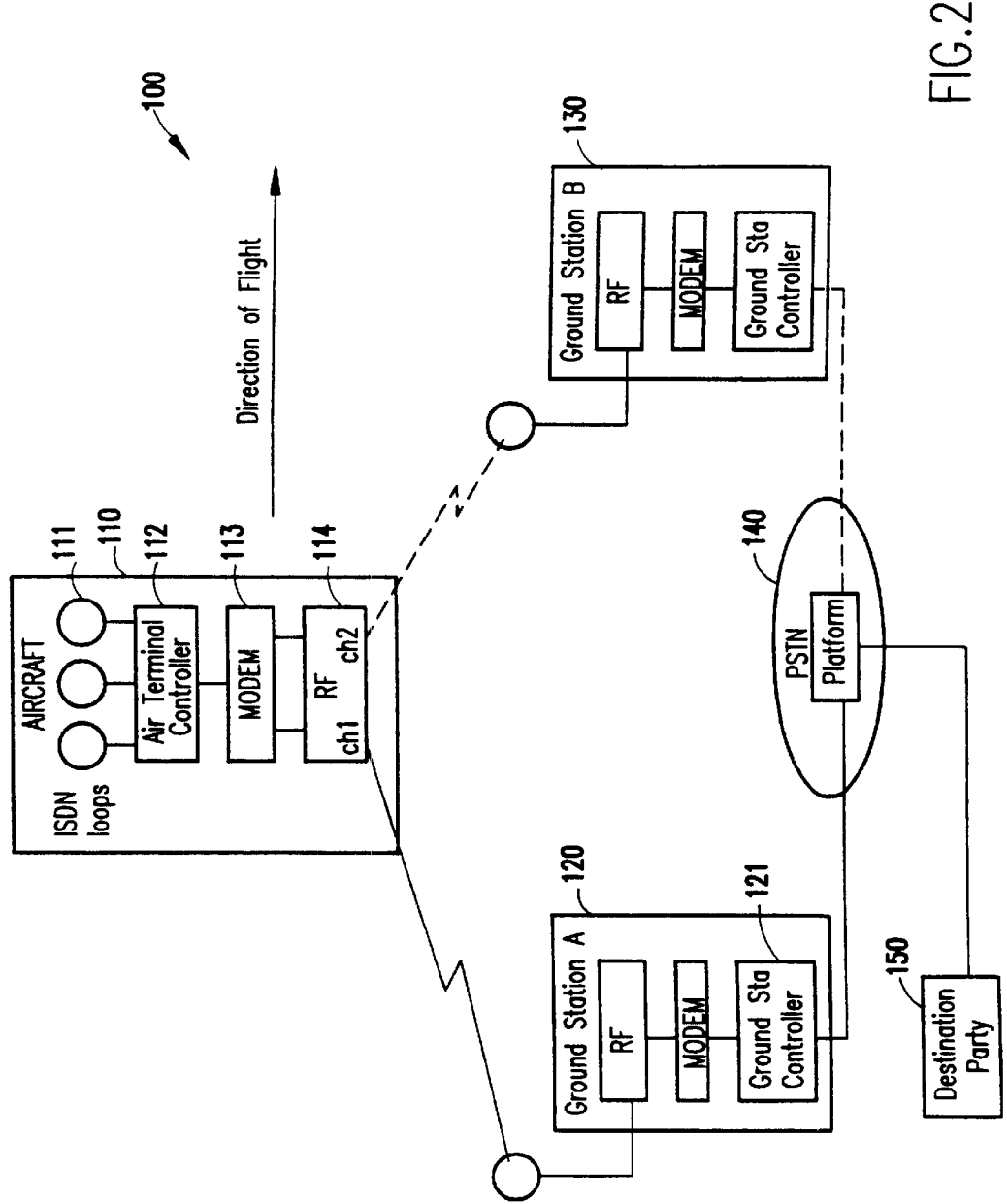
FIG. 2 is a diagram of the system organization in accordance with the invention.

Referring now to FIG. 2, the organization of the invention 100 will now be explained. In accordance with the invention, the aircraft will include an air terminal 110, preferably in the form of an integrated switching digital network (ISDN). However, the particular form of the telephone distribution provided by the air terminal is unimportant to the practice of the invention. If an ISDN network is provided, the air terminal controller will provide for an arbitrary number of ISDN terminals, each of which provides two voice channels and a control channel in one of the ISDN loops 111 to which several (preferably eight) handsets can be connected. Selectivity between these handsets is provided by air terminal controller 112 and also is unimportant to the practice of the present invention. Signals from the handsets are preferably converted into digital signals in the ISDN network and a radio frequency carrier is modulated by Modem 113 for transmission at a radio frequency by transmitter/receiver 114. Received signals are also demodulated by modem 113 to derive digital packet to be distributed and converted to analog signals by the ISDN system.

Radio transmitter 114 in the air terminal provides a minimum of two communication channels for communication with ground stations. FIG. 2 assumes a call is in progress over channel 1, communicating with ground station A 120 which also contains a radio transmitting/receiving unit and a modem. Ground station controller 121 is in some ways similar in function to the air station controller in that it should be capable of carrying a plurality of calls and directing them to different connections to a public switched telephone network (PSTN) 140 which is generally referred to as a "platform" since it supports connections between ground stations and arbitrary destination parties such as 150.

It should be understood that radio communications between the air terminal and a ground station, in accordance with the invention, are not limited to calls. Test or other predetermined forms or patterns of signals may be transmitted, as well, to ascertain the status of the radio link. In accordance with the invention, when the at least one radio communication channel (e.g. channel 2) is not being used to conduct a call, it can be used to attempt to establish a radio link with another ground station such as ground station B 130, as indicated by a dashed radio link symbol (to indicate the transmitted signal is not a call). Once such a link is established, the link can be tested in many ways in regard to transmission quality and other factors such as doppler effects due to aircraft motion. When the radio link is of sufficient quality to support high quality telecommunications, a duplicate call can be established over channel 2 through ground station 130 to platform 140 using the call identification code originally established when the call was originated over channel 1. The platform will superimpose these calls. It then becomes completely unimportant which of the channels carries the voice information and switching of ground stations can then be accomplished, in accordance with the invention by switching the connection of voice signals from or to the ISDN network between channels 1 and 2. When this switching is done, channel 1 becomes free to control termination of the connection between ground station 120 and platform 140, leaving the call through ground station 130 uninterrupted. Thereafter, channel 1 will be free to either carry newly initiated calls through ground station 130 or for use as a "probe" to search for additional ground stations to which subsequent hand-offs may be conducted in the same manner as described above. Thus, the invention provides complete autonomy of the air terminal to control which ground station will be used to carry the call. Moreover, all calls carried by the channel will be handed-off in the same operation. If additional radio channels are provided, they may be handed-off separately or together, as desired. Further, as will be explained in more detail in regard to FIG. 4, if the quality of the radio links is comparable when switching is done, the hand-off will be undetectable (e.g. seamless) to parties to the call.

Figure 3:
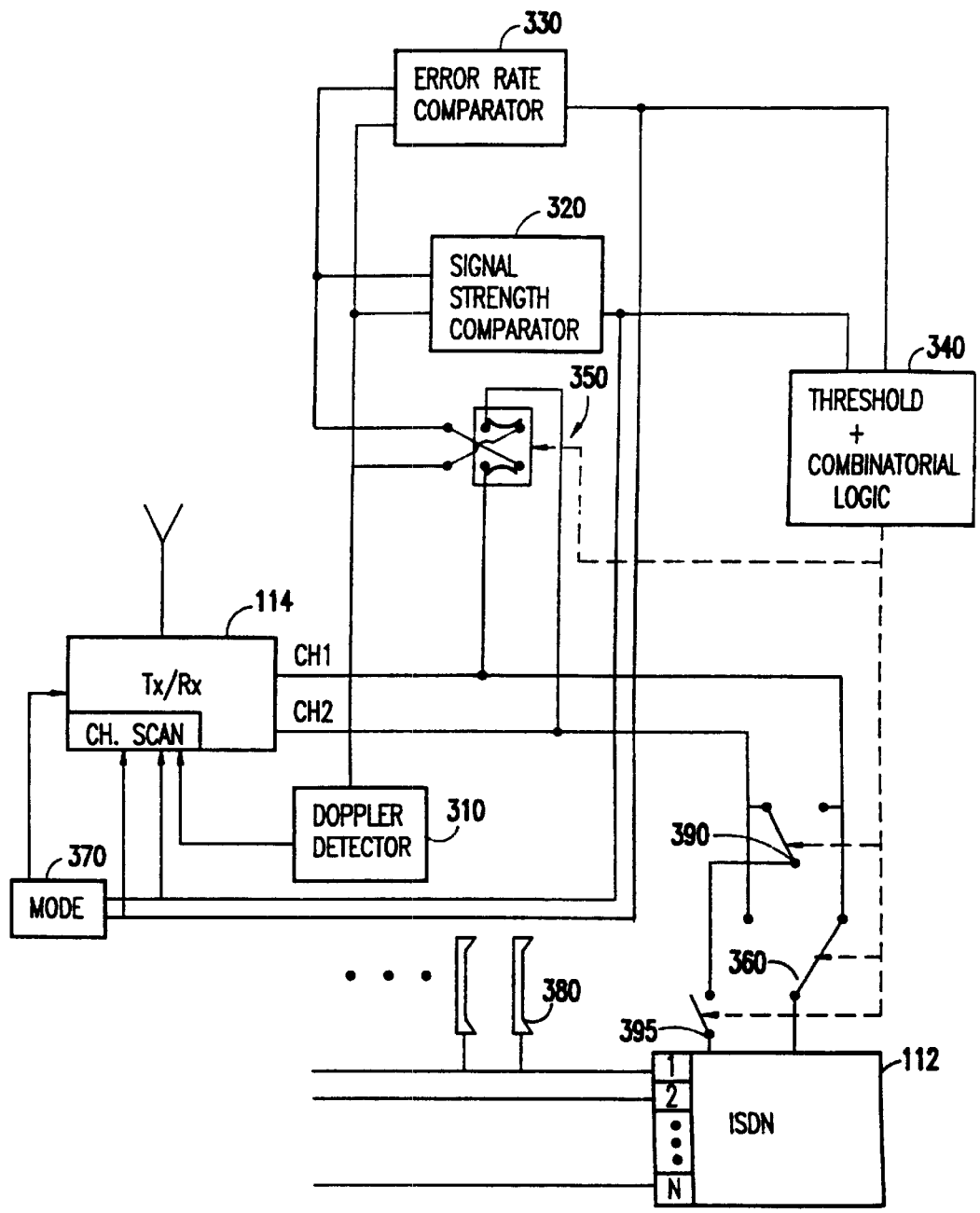
FIG. 3 is a schematic illustration of a preferred form of the invention.
Figure 4:
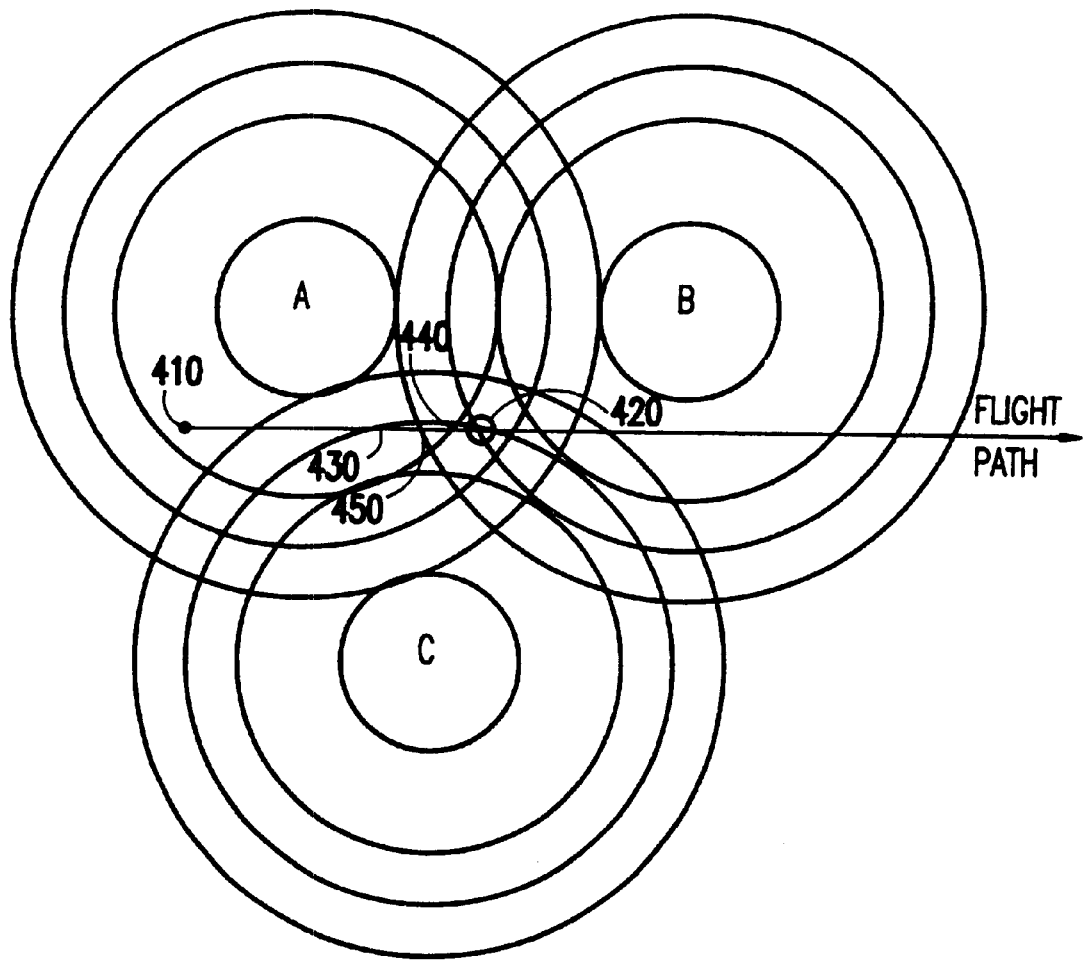
FIG. 4 is a diagram of the reception ranges of a hypothetical array of base stations.

Referring now to FIGS. 3 and 4, the detailed operation of the invention will now be explained. The same reference numerals are applied to the (ISDN) air terminal controller 112 and the radio transmitter/receiver 114 as in FIG. 2. Again assuming a call proceeding on channel 1 and channel 2 being free to search for a ground station to which a hand-off will be made, test signals will be present on channel 2 which are directed through a switch means such as a transmission gate array connected to function as a double pole-double throw (DPDT) switch and thence to a doppler effect detector 310 and comparators 320 and 330. These comparators detect the zones of respective ground station in which the aircraft is presently located by determining relative radio link quality. The Doppler effect detector will be used to expedite the search for ground stations which may be a candidate for hand-off.

Referring now to FIG. 4, an array of cell envelopes such at that of FIG. 1 is shown and the respective cells are labelled A, B and C. The separation of ground stations A and B relative to the size of their respective envelopes is ideal for maximum performance and economy. That is the optimal service thresholds of these ground stations meet more or less precisely. On the other hand, as is often the case, envelope C is not precisely located in a grid pattern for optimum coverage. Assuming a call to have begun at location 410 along a flight path, the call would have been initiated through ground station A. If earlier, the call would have been handed off to ground station A at least by point 410. By the time the aircraft has proceeded to the area marked by circle 420, assuming the call to continue, the optimum hand-off zone of ground station A would also have been reached. Note that at this point, the aircraft will have already entered the optimal hand-off zone for ground station C. Between point 430 and point 440, however the aircraft is still within the preferred ground station selected zone of ground station A and hand-off will not be attempted between point 440 and region 420, the aircraft will have passed the point of nearest proximity to ground station C and when a radio link with ground station C is tested for Doppler effects in this region, the effects will be zero or slightly negative, indicating that the aircraft is travelling away from ground station C. While a hand-off to ground station C would be possible, it is clear that another hand-off would be required shortly since the aircraft is near the minimal service threshold of ground station C and flying away from it. In this way, the search for candidate ground stations can be expedited sufficiently to reliably achieve hand-off within a period which may be as short as four minutes, as noted above. In theory, ground station B could be located as early as point 450, once ground station C was eliminated as a candidate by exhibiting a lower value of Doppler effects than ground station B. Assuming a radio link was achieved with ground station B, hand-off would then occur somewhere within approximately area 420 or somewhat beyond where the optimum hand-off zones of ground stations A and B overlap. Note that in region 420, the relative proximity of the aircraft to each of ground stations B and C and the relative radio link quality is about equal. However, there is no ambiguity of operation in this and in most cases because of the discrimination based on the value of Doppler effects.

Returning now to FIG. 3, it is seen that signals on both channels 1 and 2 are directed through switch 350 to a signal strength comparator 330. 320 and/or an error rate comparator. These elements detect these respective transmission quality values in the signal received over each channel and compare them. If one or more of the values are not comparable, a channel scan control causes another radio link to be established and tested. On the other hand, the comparators also preferably apply a threshold and can terminate search for further candidates for hand-off when the values compare within a given tolerance. At this level of favorable comparison and when a candidate for hand-off has been selected, the search channel is placed in a mode referred to as the overhead mode by mode control 370 and a predetermined code is transmitted over channel 2 to place calls through the candidate ground station using the previously established call identification code for each call.

When the error rates and or signal strengths (and/or other values) compare closely or when the radio link of the search channel becomes of higher quality than the call channel, hand-off is controlled by combinatorial logic unit 340 (which may also provide a threshold difference in quality or impose a time duration over which the improvement in quality must be maintained before hand-off is commanded) by causing switching of the voice signal of the call signals to and from the air terminal network 112 and handset 380 to the channel previously used for the ground station search and testing to complete the hand-off of the call. Other values such as signal-to-noise ratio could be detected as well for causing this switching to take place. Whatever values or combination of values are used, however, comparable quality of radio links is assured and hand-off will be seamless and usually undetectable to users. Also, due to the symmetry of envelopes of the respective cells about the aircraft position at the instant of hand-off, time delays will also be comparable and little or no noise or delays in the voice signal will occur. At the same time switch means 350 is toggled (equivalently, the names of the channels could be changed in software) to allow search signals from channel 1 to be evaluated in the same manner as channel 2, as discussed above.

However, immediately after hand-off of the call by switching at switch 360, the channel which had previously carried the call preferably assumes the overhead mode and a further predetermined signal is sent to terminate the connection to telephone platform 140 through the ground station 120 and to terminate the previous radio link. The details of this operation are of little importance to the practice of the invention since use of the free channel to search for a further link will terminate the radio link, especially because the previous link will always exhibit a zero or negative value of Doppler effects. Normal call time out procedures will then terminate the connection from the previous ground station to the platform. However, some additional search time may be made available by deliberately terminating the previous connection through operation of the channel briefly in the overhead mode.

Thus it is seen that by comparison of transmission quality values on at least two radio channels, alternate call paths may be established as needed and the call may be handed-off seamlessly and autonomously from the ground stations without need for synchronization of ground stations or communication therebetween.

In the preferred embodiment of the invention, the zones, as they are determined by comparators 320 and 330, may be used to enhance the call-carrying capacity of the air terminal by control of the network 112 by combinatorial logic unit 340. Specifically, when it is detected that the aircraft is in the steady state zone 10, hand-off is not possible due to the spacing of ground stations and both channels may be used for carrying calls by causing connection of network 112 to the other channel through switches schematically depicted at 390 and 395. Calls initiated during this state of operation may be continued well after the aircraft has left the steady state zone and, potentially the cell. In this latter case, no searching could be conducted if all communication channels are occupied with calls. Therefore, it is also preferred to have more than two channels so that one channel is likely to be available for searching in the Preferred ground station selected zone. It is preferred to implement this control by providing that seizure of at least one channel is prevented when it is detected that the aircraft is in any of zones 30, 50 or 70. Thus, even if all channels are used for calls in the steady state zone, the first channel to be released after the aircraft has left that zone cannot be again seized until presence in another steady state zone is detected.

If, however, no channel becomes available until presence in the mandatory hand-of zone is detected, hand-off will be performed for the first candidate with which a radio link is established. This circumstance, for example, could cause a short duration hand-off to ground station C and thereafter to ground B in the scenario of FIG. 4. Nevertheless, this operation is tolerable and the call connection is not broken. If all lines are occupied until after the aircraft has exited the cell, all connections will be broken but a search channel will become immediately available and only the calls on a single channel will not be recoverable. Detection of presence in the mandatory hand-off zone can also be used to scan the channels to determine the channel carrying the lowest number of calls to minimize call loss.

In view of the foregoing, it is seen that the invention provides an arrangement which will provide seamless hand-off of calls between ground stations while minimizing the complexity thereof compared to known arrangements. The need in prior arrangements for synchronization of ground stations has been eliminated and there is no need for communications between ground stations as was previously required. The hand-off of calls is completely autonomous to the air terminal and can thus be optimized or customized for the needs of the particular aircraft. In fact, there are no special requirements whatever in regard to the telephone platform and no special functions are required in the ground stations. Accordingly, the invention is immediately applicable to existing telecommunications worldwide.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for providing communication between a mobile terminal and a plurality of unsynchronized base stations comprising the steps of:

initiating the establishment of a first two-way call over a first communication link, said first two-way call carrying two-way signals between said mobile terminal and a first base station;

establishing a second communication link between said mobile terminal and a second base station;

evaluating at least one characteristic of said second communication link at said mobile terminal;

in response to said evaluating step, said mobile terminal initiating the establishment of a second two-way call, which is a duplicate of said first two-way call, over said second communication link while said first two-way call exists; and performing a hand-off by simultaneously switching said two-way signals from said first communication link to said second communication link under control of said mobile terminal.

2. The method of claim 1 wherein said two-way signals are voice signals.

3. The method of claim 1 wherein said two-way signals are data signals.

4. The method of claim 1 wherein:

said mobile terminal is an airborne terminal;

said plurality of unsynchronized base stations are ground stations linked by a platform coupled to a public switched telephone network; and said first and second communication links are air to ground communication links.

5. The method of claim 1 further comprising the steps of:

terminating said first two-way call; and dropping said first communication link.

6. The method of claim 1 wherein said at least one characteristic is Doppler effect.

7. A method for providing communication between a mobile terminal having a plurality of communication channels and a plurality of unsynchronized base stations comprising the steps of:

initiating the establishment of a first call carrying two-way signals between said mobile terminal and a first base station over a first communication channel of said mobile terminal;

searching for a second base station using a second communication channel of said mobile terminal;

in response to said searching step, said mobile terminal initiating the establishment of a second call over said second communication channel while said first call exists, said second call being a duplicate of said first call; and simultaneously transferring said two-way signals from said first call to said second call under control of said mobile terminal.

8. The method of claim 7 wherein said two-way signals are voice signals.

9. The method of claim 7 wherein said two-way signals are data signals.

10. The method of claim 7 farther comprising the steps of:

terminating said first call; and searching for a third base station using said first communication channel.

11. A method for providing communication between a mobile terminal having a plurality of communication channels and a plurality of base stations comprising the steps of:

establishing a first communication link between said mobile terminal and a first base station over a first communication channel, said communication link carrying a first plurality of two-way calls carrying two-way signals;

establishing a second communication link between said mobile terminal and said first base station over a second communication channel, said second communication link carrying a second plurality of two-way calls carrying two-way signals;

detecting the presence of the mobile terminal in a mandatory hand-off zone;

in response to said step of detecting, determining which of said first or second communication links is carrying fewer two-way calls;

dropping the communication link carrying the fewer calls; and searching for a second base station using the communication channel which was used to establish the dropped communication link.

12. The method of claim 11 further comprising the step of:

in response to said step of searching, establishing a third communication link between said mobile terminal and said second base station over the communication channel which was used to search for said second base station;

initiating the establishment of a third plurality of two-way calls, each of which is a duplicate of an associated one of said plurality of two-way calls which are carried by the communication link carrying the greater number of calls; and performing a hand-off by simultaneously switching said two-way signals from said communication link carrying the greater number of calls to said third communication link under control of said mobile terminal.

13. A method for providing communication between a mobile terminal having a plurality of communication channels and a plurality of base stations comprising the steps of:

establishing at least one communication link between said mobile terminal and a first base station over at least one communication channel, said at least one communication link carrying at least one two-way call;

determining when said mobile terminal has left a steady state zone; and in response to said determining step, preventing the establishment of a communication link carrying at least one two-way call over at least one other communication channel when said mobile terminal has left a steady state zone.

14. The method of claim 13 further comprising the step of:

searching for a second base station using said at least one other communication channel.

15. The method of claim 13 wherein said step of determining when said mobile terminal has left a steady state zone further comprises the step of:

evaluating the communication link quality of said at least one communication link.

16. A mobile terminal for providing communication between at least one mobile station coupled to said mobile terminal and a plurality of unsynchronized base stations, said mobile terminal comprising:

a transmitter/receiver for establishing a first communication link with a first base station over a first communication channel, said first communication link carrying a first two-way call, and said transmitter/receiver for establishing a second communication link with a second base station over a second communication channel;

a controller coupled to said transmitter/receiver for providing two-way call signals between said first base station and said at least one mobile station over said first communication link;

a comparator coupled to said transmitter/receiver for evaluating signals received over said second communication link;

a mode controller coupled to said transmitter/receiver and said comparator for initiating a second two-way call over said second communication link while said first two-way call exists, wherein said second two-way call is a duplicate of said first two-way call; and a logic unit coupled to said transmitter/receiver and said controller for controlling a hand-off such that the provision of two-way call signals to and from said at least one mobile station is simultaneously switched from said first communication link to said second communication link.

17. The mobile terminal of claim 16 wherein said at least one mobile station is a telephone handset.

18. The mobile terminal of claim 16 wherein said two-way call signals are voice signals.

19. The mobile terminal of claim 16 wherein said two-way call signals are data signals.

20. The mobile terminal of claim 16 wherein said controller further comprises an integrated switching digital network controller.

21. The mobile terminal of claim 16 further comprising a Doppler effect detector for evaluating signals received over said second communication link.

22. A system for providing mobile communication comprising:

a first base station and a second base station, wherein said first and second base stations are unsynchronized;

a mobile terminal for initiating the establishment of a first two-way call over a first communication link, said first two-way call carrying two-way signals between said mobile terminal and said first base station, and for establishing a second communication link between said mobile terminal and said second base station, said mobile terminal evaluating the quality of signals received over said second communication link and upon determining said quality being acceptable, sending a duplicate call setup signal over said second communication link;

a platform coupled to said first base station and said second base station and supplying said two-way call signals between said first base station and a fixed station coupled to said platform, for receiving said call setup signal and in response thereto establishing a second two-way call over said second communication link which is a duplicate of said first two-way call, and for superimposing said first and second two-way calls; and wherein said mobile terminal further comprises switch means for simultaneously switching said two-way signals from said first communication link to said second communication link thereby accomplishing a hand-off of communications between said first base station and said second base station.

23. The system of claim 22 wherein:
said mobile terminal is an airborne terminal;
said first and second base stations are ground stations; and
said first and second communication links are air to ground communication links.

24. The system of claim 22 wherein said platform is coupled to a public switched telephone network.

25. The system of claim 22 wherein said mobile terminal is coupled to at least one telephone handset.

26. The system of claim 22 wherein said two-way signals are voice signals.

27. The system of claim 22 wherein said two-way signals are data signals.

* * * * *

UNITED STATES PATENT AND TRADEMARK OFFICE
CERTIFICATE OF CORRECTION

PATENT NO. : 6,393,281 B1
DATED : May 21, 2002
INVENTOR(S) : Capone et al.

It is certified that error appears in the above-identified patent and that said Letters Patent is hereby corrected as shown below:

<u>Column 6,</u>
Line 35, delete "330";

<u>Column 9,</u>
Line 11, "farther" should be -- further --;

Signed and Sealed this

Twenty-third Day of July, 2002

Attest:

Attesting Officer

JAMES E. ROGAN
*Director of the United States Patent and Trademark Office*